(12) United States Patent
Tokunaga

(10) Patent No.: US 7,933,432 B2
(45) Date of Patent: Apr. 26, 2011

(54) INFORMATION RETRIEVAL SYSTEM FOR CAR NAVIGATION SYSTEMS

(75) Inventor: Kazunori Tokunaga, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1018 days.

(21) Appl. No.: 11/523,022

(22) Filed: Sep. 19, 2006

(65) Prior Publication Data

US 2007/0127776 A1 Jun. 7, 2007

(30) Foreign Application Priority Data

Nov. 24, 2005 (JP) ................................. 2005-339129

(51) Int. Cl.
*G06K 9/00* (2006.01)

(52) U.S. Cl. ........................................................ 382/104

(58) Field of Classification Search .................. 701/200, 701/208, 209, 201, 211; 382/104

See application file for complete search history.

(56) References Cited

U.S. PATENT DOCUMENTS

| 6,374,180 B1 * | 4/2002 | Slominski et al. ............ 701/208 |
| 2007/0016360 A1 * | 1/2007 | Lee et al. ....................... 701/200 |

FOREIGN PATENT DOCUMENTS

| JP | 2000-89782 A | 3/2000 |
| JP | 2001-41762 A | 2/2001 |
| JP | 2004-127049 A | 4/2004 |
| JP | 2005-10017 A | 1/2005 |
| JP | 2005-62976 A | 3/2005 |

* cited by examiner

*Primary Examiner* — Anand Bhatnagar
*Assistant Examiner* — Claire Wang
(74) *Attorney, Agent, or Firm* — Arent Fox, LLP

(57) ABSTRACT

Provided is an information retrieval system for car navigation systems that allows a vehicle occupant to designate a destination both easily and quickly. Each address is given as a combination of a plurality of strings of characters, each string corresponding to one of a plurality of search hierarchy levels, and the character strings are stored in a storage unit. If a current hierarchy level does not include any candidate of data that corresponds to a character entered by a user on an interface unit, a character type data search unit retrieves candidates from a next lower hierarchy level. Thereby, even if the use does not know a part of an address, the vehicle operator is able to successfully reconstruct the full address and enter a destination in an unambiguous manner. Such a candidate or candidates may be displayed on the monitor in combination with the corresponding data of the next higher hierarchy level. Alternatively, after the candidate or one of the candidates is selected by the user, corresponding candidates of data in the next higher hierarchy level may be displayed on the monitor.

5 Claims, 19 Drawing Sheets

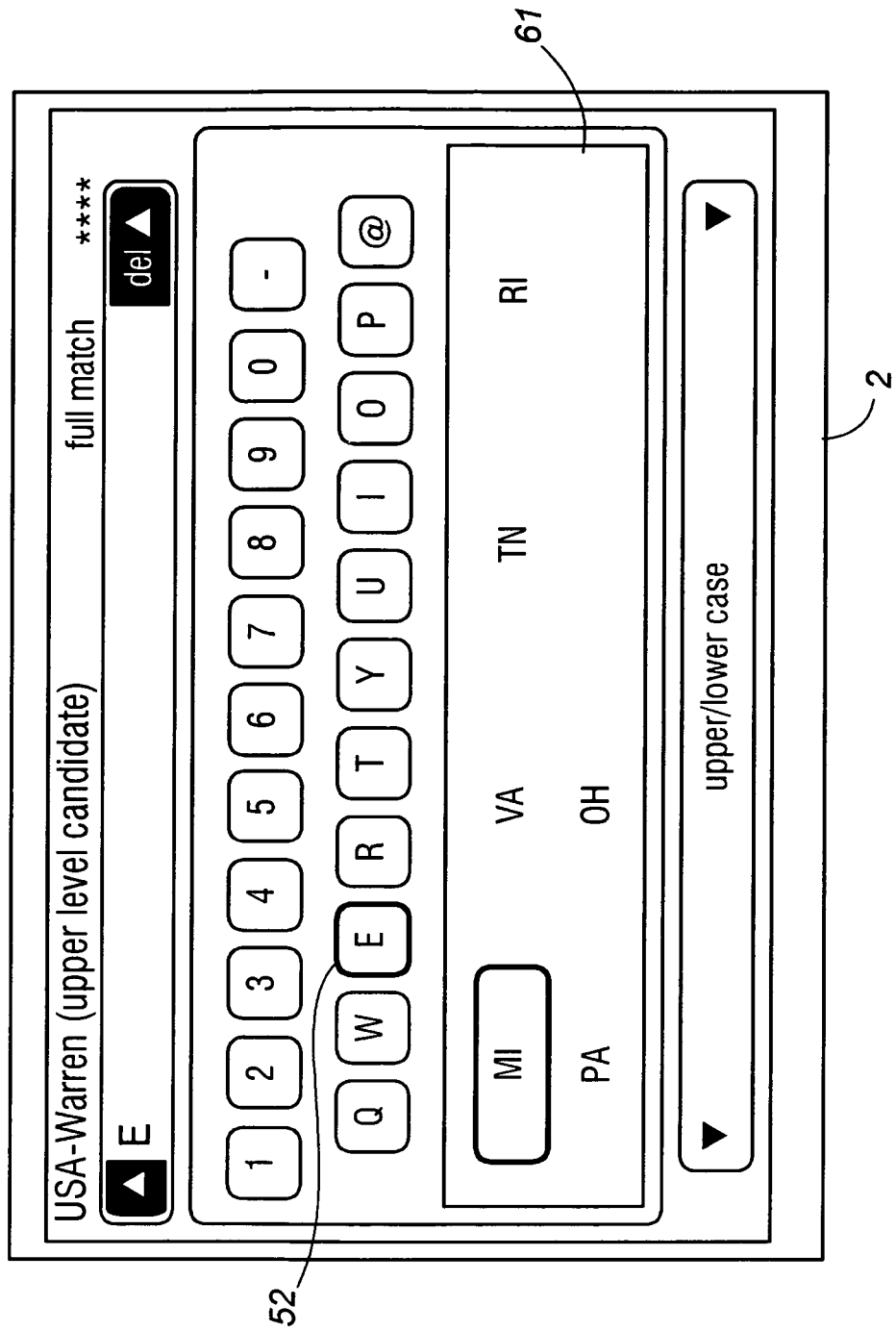

INFORMATION RETRIEVAL SYSTEM FOR CAR NAVIGATION SYSTEMS

TECHNICAL FIELD

The present invention relates to an information retrieval system which is suitable for use in car navigations systems for designating a destination.

BACKGROUND OF THE INVENTION

A car navigation system aids a vehicle operator to navigate by allowing the vehicle operator to designate a destination on a map stored in a storage unit such as HDD and DVD-ROM, determining an optimum route to the designated destination and identifying the current position of the vehicle according to the position information obtained from GPS satellites. A destination can be designated in a number of different ways such as addresses, spot names, telephone numbers, ZIP codes and so on.

The address is considered to be highly reliable and convenient in designating a destination. An address is given as a combination of data of several hierarchy levels, and can be narrowed down to progressively lower hierarchy levels. For instance, the topmost hierarchy level may consist of "state", and the second hierarchy level "city", the third hierarchy level "street", and the fourth hierarchy level "house number". Typically, a car navigation system is equipped with a user interface in such forms as a touch screen showing an alphanumeric keypad and a remote control combined with a video display to enable the vehicle operator to enter a desired command.

Japanese patent laid open publication No. 2001-41762 discloses an arrangement in which a number of candidates each in the form of a string of characters are displayed for each hierarchy level so that the vehicle operator may select a candidate in each hierarchy level from the topmost one to the lowermost one. Japanese patent laid open publication No. 2004-127049 discloses an arrangement in which an alphanumeric keypad is displayed on a monitor so that the vehicle operator may enter a string of characters for designating a destination.

However, the conventional arrangements for designating and retrieving the address of a destination were not entirely satisfactory in regards to efficiency and convenience. According to the arrangement disclosed in Japanese patent laid open publication No. 2001-41762, the 50 states (the first hierarchy) are displayed, and upon selecting one of the states, a large number of cities belonging to the selected state (second hierarchy) are displayed. Therefore, the vehicle occupant has to scroll the display until a desired city is shown, and it therefore requires a long time for the vehicle operator to be able to select the desired city. According to the arrangement disclosed in Japanese patent laid open publication No. 2004-127049, the vehicle operator has to enter a string of characters from a keypad displayed on the monitor, and may be required to enter a large number of characters before obtaining the name of the desired city. Also, in either case, if the vehicle operator knows the name of the city but does not know the name of the state, the vehicle operator is not able to move on from the first hierarchy to the second, and is unable to designate the destination at all.

BRIEF SUMMARY OF THE INVENTION

In view of such problems of the prior art, a primary object of the present invention is to provide an information retrieval system for car navigation systems that allows a use such as a vehicle operator to designate a destination both easily and quickly.

A second object of the present invention is to provide an information retrieval system that is highly flexible and convenient to use.

According to the present invention, such objects can be accomplished by providing an information retrieval system, comprising; a storage unit storing a character type database containing character data in a plurality of search hierarchy levels; an interface unit allowing a user to enter characters; a character type data search unit retrieving character data designated by the interface unit from a higher hierarchy level to a lower hierarchy level; a monitor displaying one or a plurality of candidates of data retrieved from each hierarchy level of the database, the interface unit allowing the user to select a desired one from the candidate or candidates; wherein if a current hierarchy level does not include any candidate of data that corresponds to a character string entered by the user on the interface unit, the character type data search unit retrieves candidates from a next lower hierarchy level.

Thereby, even if the use does not know a part of an address, the vehicle operator is able to successfully reconstruct the full address and enter a destination in an unambiguous manner. The user may enter a character string consisting of a single character to invoke candidates which are typically large in number, or a string of characters of a greater length to narrow down the candidates to a small number.

When a current hierarchy level does not include any candidate of data that corresponds to the character string entered by the user on the interface unit and the character type data search unit retrieves a candidate or candidates from a next lower hierarchy level, the character type data search unit may display the candidate or candidates on the monitor in combination with the corresponding data of the next higher hierarchy level. Thereby, the address can be fully identified even when an upper hierarchy level information of the address is missing. Alternatively, the character type data search unit may display the candidate or candidates on the monitor so that after the candidate or one of the candidates is selected by the user, corresponding candidates of data in the next higher hierarchy level may be displayed on the monitor for the same purpose.

According to a preferred embodiment of the present invention, the character type data search unit may be configured to receive a string of characters entered from the interface unit and retrieve data that corresponds to the string of characters from each hierarchy level. The data may consist of address information of a car navigation system.

BRIEF DESCRIPTION OF THE DRAWINGS

Now the present invention is described in the following with reference to the appended drawings, in which:

FIGS. 18 and 19 are displays on the monitor when executing the address search according to the modified embodiment of the present invention.

DETAILED DESCRIPTION OF THE PREFERRED EMBODIMENTS

Figure 1:
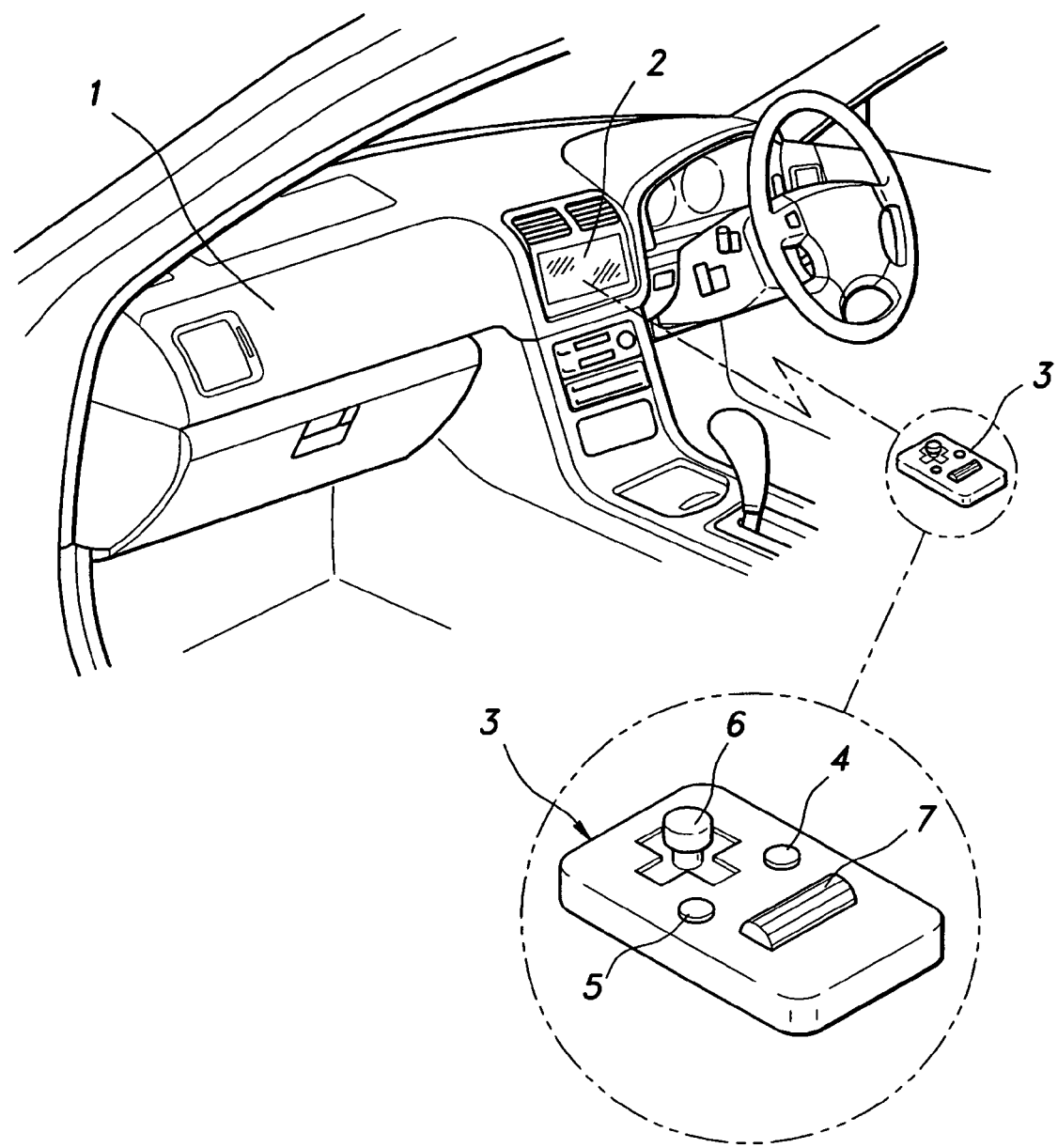
FIG. 1 is a fragmentary perspective view of a front part of a cabin of an automobile fitted with a car navigation system embodying the present invention.

Referring to FIG. 1, an instrument panel 1 of an automobile is centrally fitted with a monitor 2 for a car navigation system so that the vehicle operator may be informed of the position and direction of the vehicle by viewing the display on the monitor 2. The monitor 2 is incorporated with a touch screen that allows the vehicle operator to enter a destination and other information to the car navigation system by touching the screen. The car navigation system is also equipped with a remote control 3 that also allows the vehicle operator to control the car navigation system with the aid of a corresponding display on the monitor 2. The remote control 3 is provided with a power-on switch 4, a menu switch 5, a joystick 6 and a jog dial 7 that can be both turned and pushed.

Figure 2:
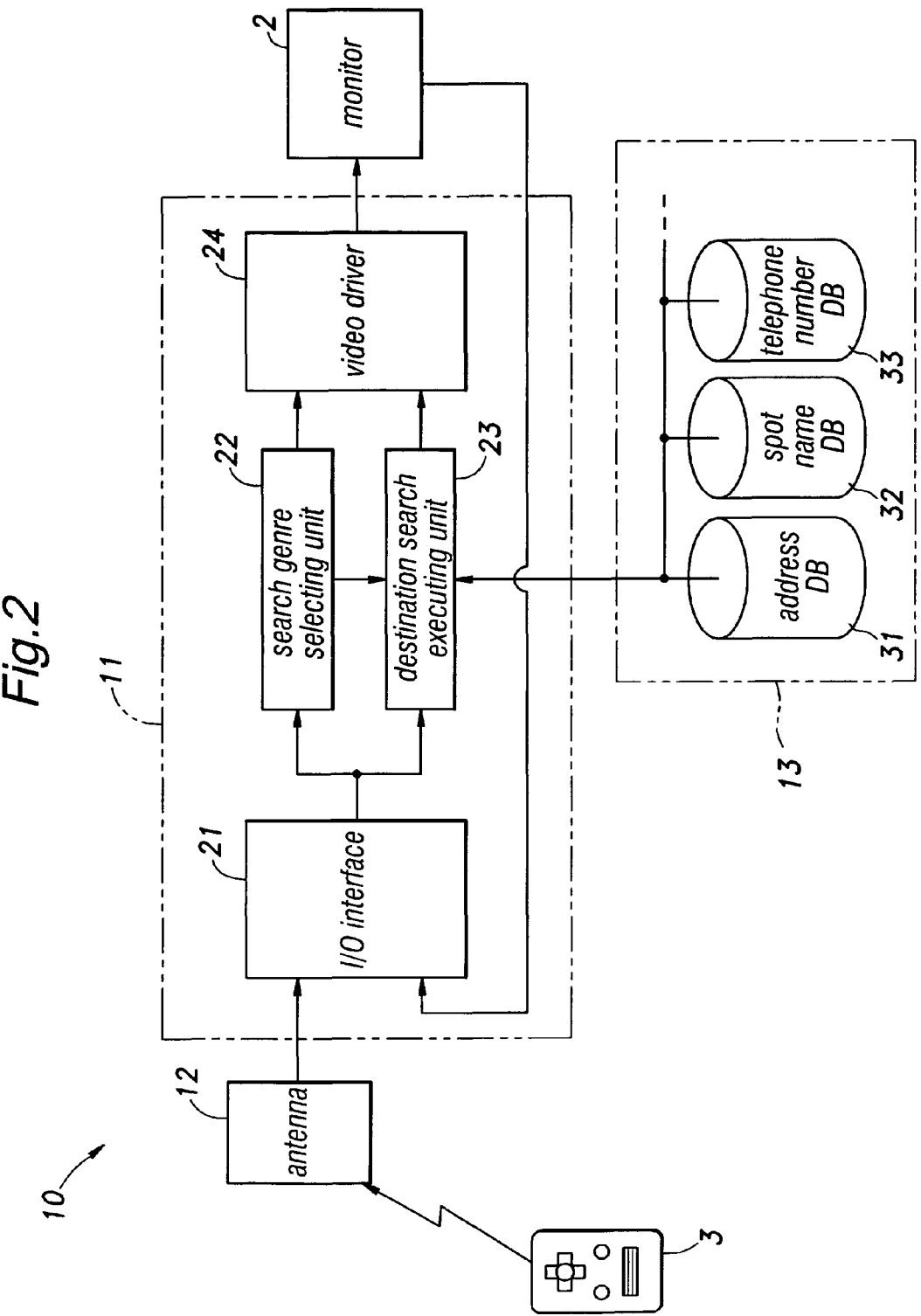
FIG. 2 is a block diagram showing the functional structure of the destination search unit of the car navigation system according to the present invention.

Referring to FIG. 2, in addition to the monitor 2 and remote control 3, the car navigation system is provided with a destination search unit 10 that comprises a search unit main body 11, an antenna 12 for receiving a signal from the remote control 3 and a data storage unit (such as HDD and DVD-ROM) 13. The search unit main body 11 is connected to the monitor 2, antenna 12 and data storage unit 13 via an onboard communication line such as CAN (controller area network).

The search unit main body 11 comprises a microcomputer, ROM, RAM, peripheral circuit, I/O interface 21 and video driver 24 in terms of hardware, and provided 4 with such functional units as a search genre selecting unit 22 that determines a search genre according to a command signal received from the I/O interface 21, a destination search executing unit 23 for executing a destination search according to a signal received from the search genre selecting unit 22. The video driver 24 produces a video drive signal for the monitor 2 according to a signal received from the search genre selecting unit 22 and destination search executing unit 23

Figure 3:
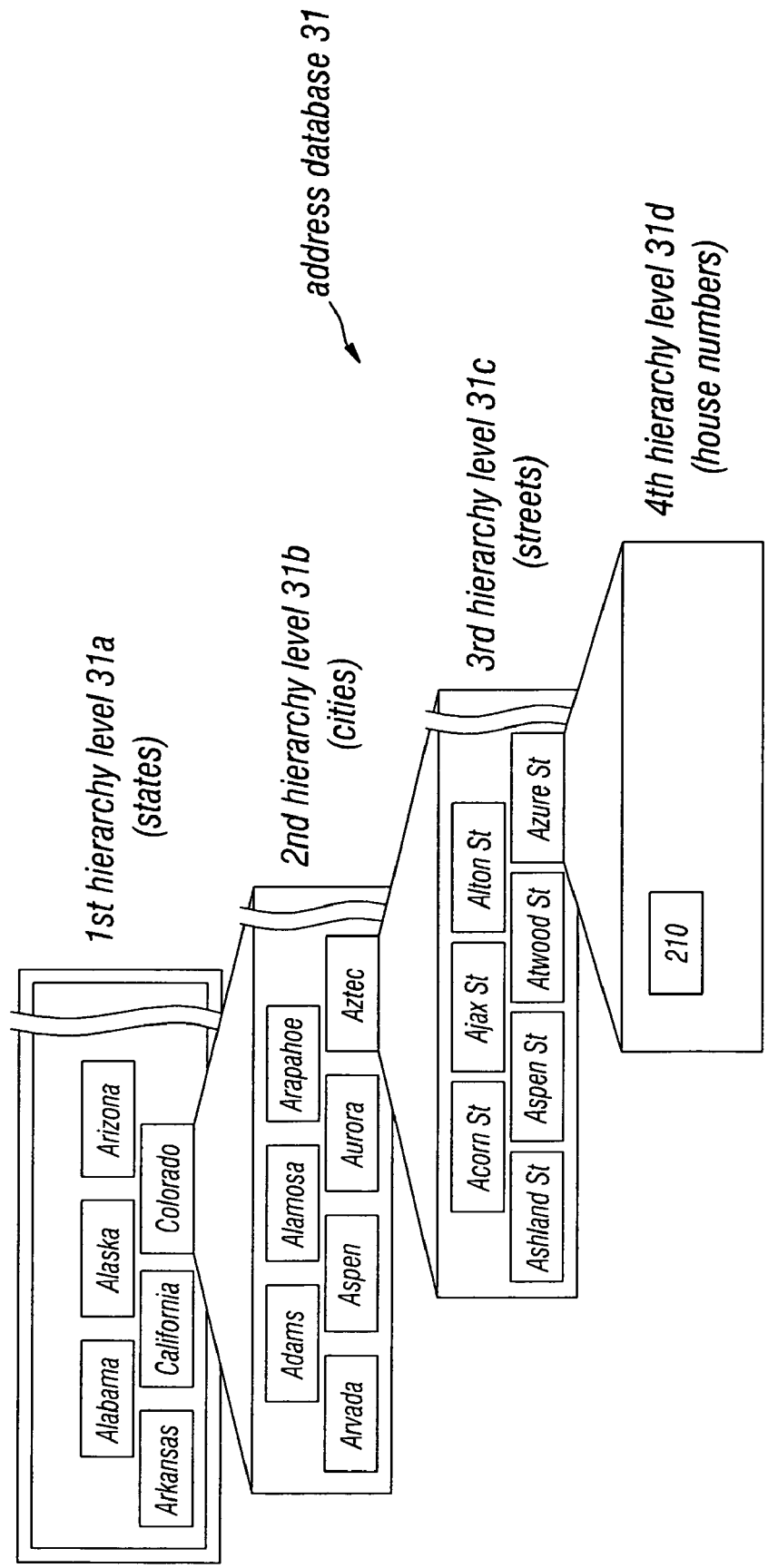
FIG. 3 is a diagram showing the hierarchy structure of the address database according to the present invention.

The data storage unit 13 stores various character string databases such as an address database 31, spot name database 32 and telephone number database 33, and provides character string information that corresponds to a command from the destination search executing unit 23. As shown in FIG. 3, the address database 31 has a hierarchy of four levels consisting of a first level for state names, a second level for city names, a third level for street names and a fourth level for house numbers.

The car navigation system is started up by pressing the power-up switch 4 on the remote control 3. The monitor 2 then displays a map that includes the current location, but can show other information such as maps of other locations, global maps, menu buttons (a destination set button, a mark set button and a map display button) according to a command from a user. In the illustrated embodiment, various buttons (not shown in the drawings) are provided under the monitor 2 so that the car navigation system may be controlled also by pressing such buttons.

<<Spot Name Search>>

Figure 4:
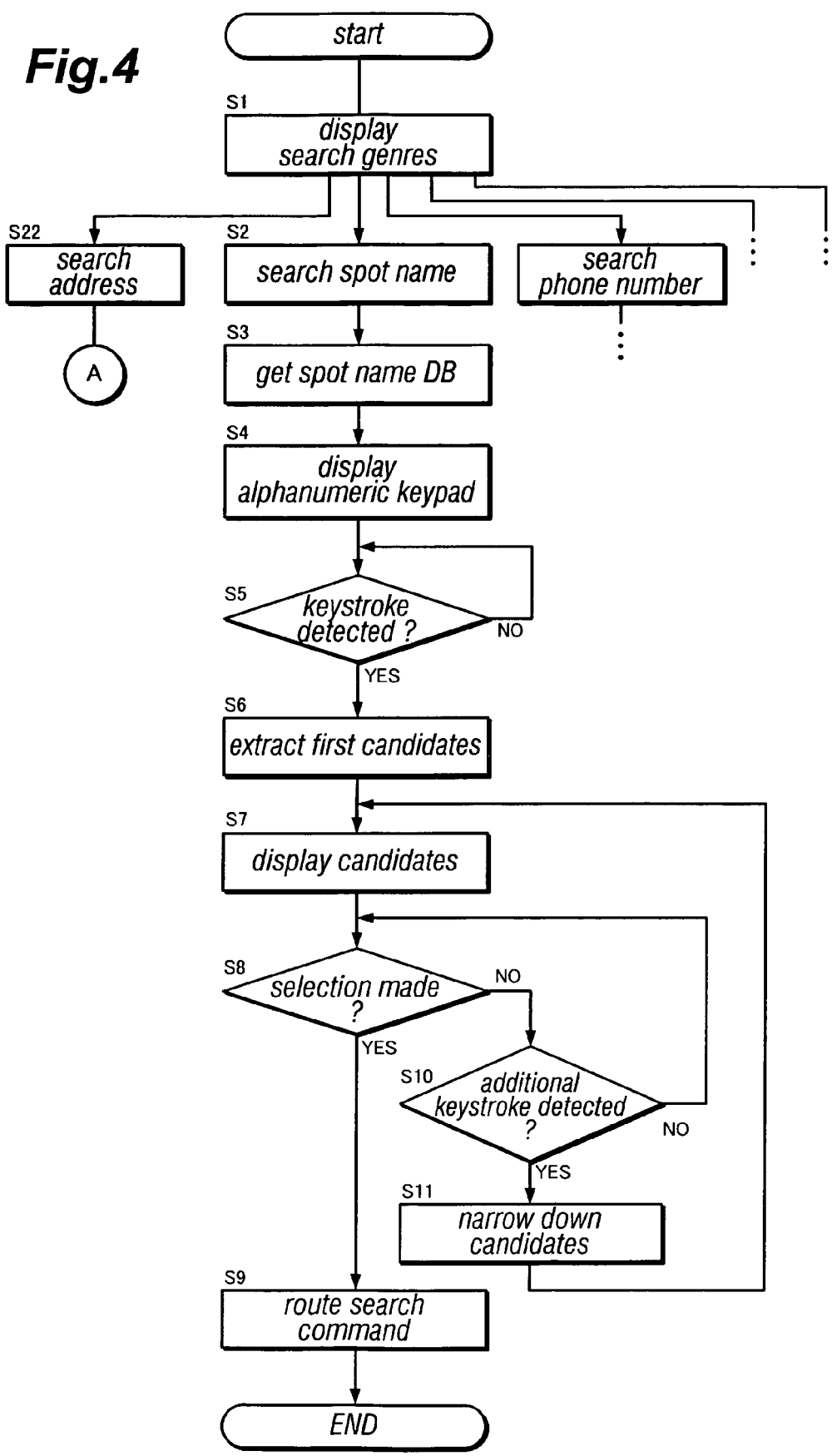
FIG. 4 is a flowchart showing the process flow when searching a spot by its name.
Figure 5:
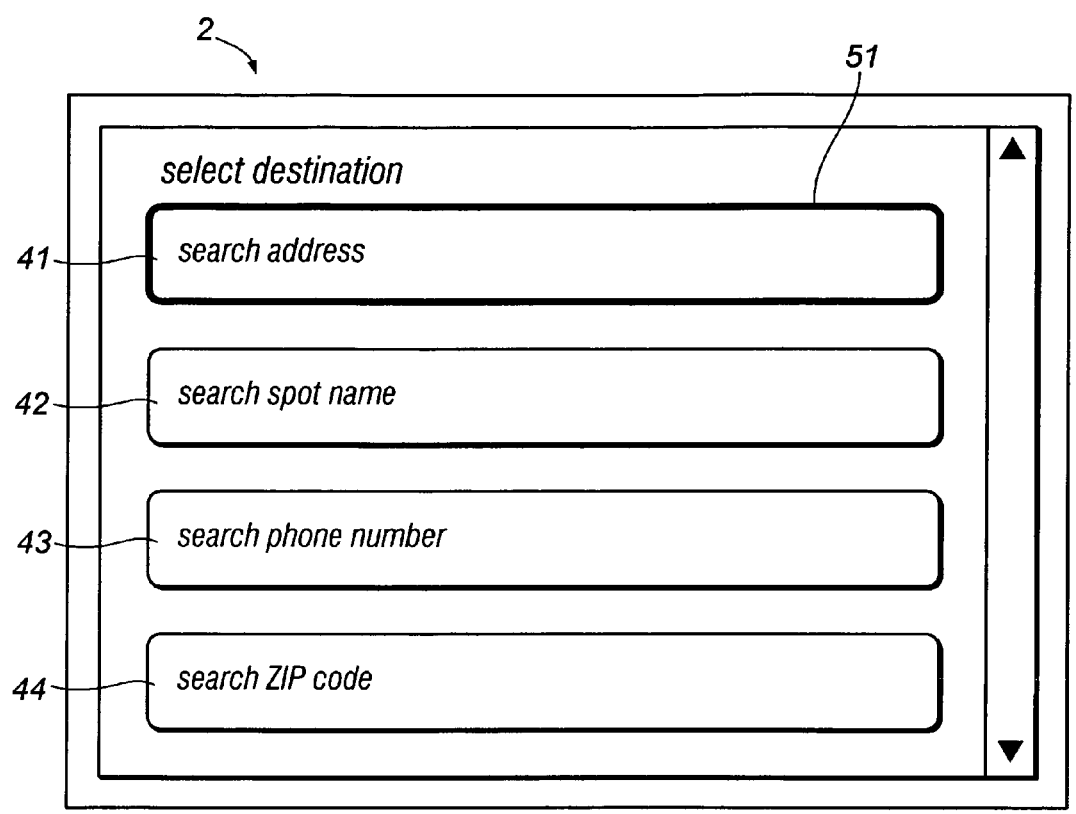
FIGS. 5 to 8 are displays on the monitor when executing a spot name search.

Suppose that the vehicle operator desires to travel to Metropolitan Museum in New York City. First of all, the vehicle operator presses a destination select button. The search unit main body 11 constantly monitors if the destination select button is pressed at a prescribed processing interval such as 10 ms, and upon detecting that the destination select button is pressed, the search unit main body 11 starts executing a destination search process as shown in the flowchart of FIG. 4. Various search genres are displayed on the monitor 2 in step S1. As shown in FIG. 5, the search genres are displayed on the monitor 2 as laterally elongated boxes arranged in a vertical row that also serve as buttons of the touch screen. The buttons include an address search button 41, a spot name search button 42, a telephone number search button 43 and a zip code search button 44. Initially, the address search button 41 is highlighted by surrounding it with a colored selection frame 51. In the illustrated embodiment, turning the jog dial 7 causes the display on the monitor 2 to scroll, and moving the joystick 6 causes the selection frame 51 to move up and down from one button to another. Pressing the jog dial 7 confirms the selection of the particular button on which the selection frame 51 is located (step S2).

Figure 6:
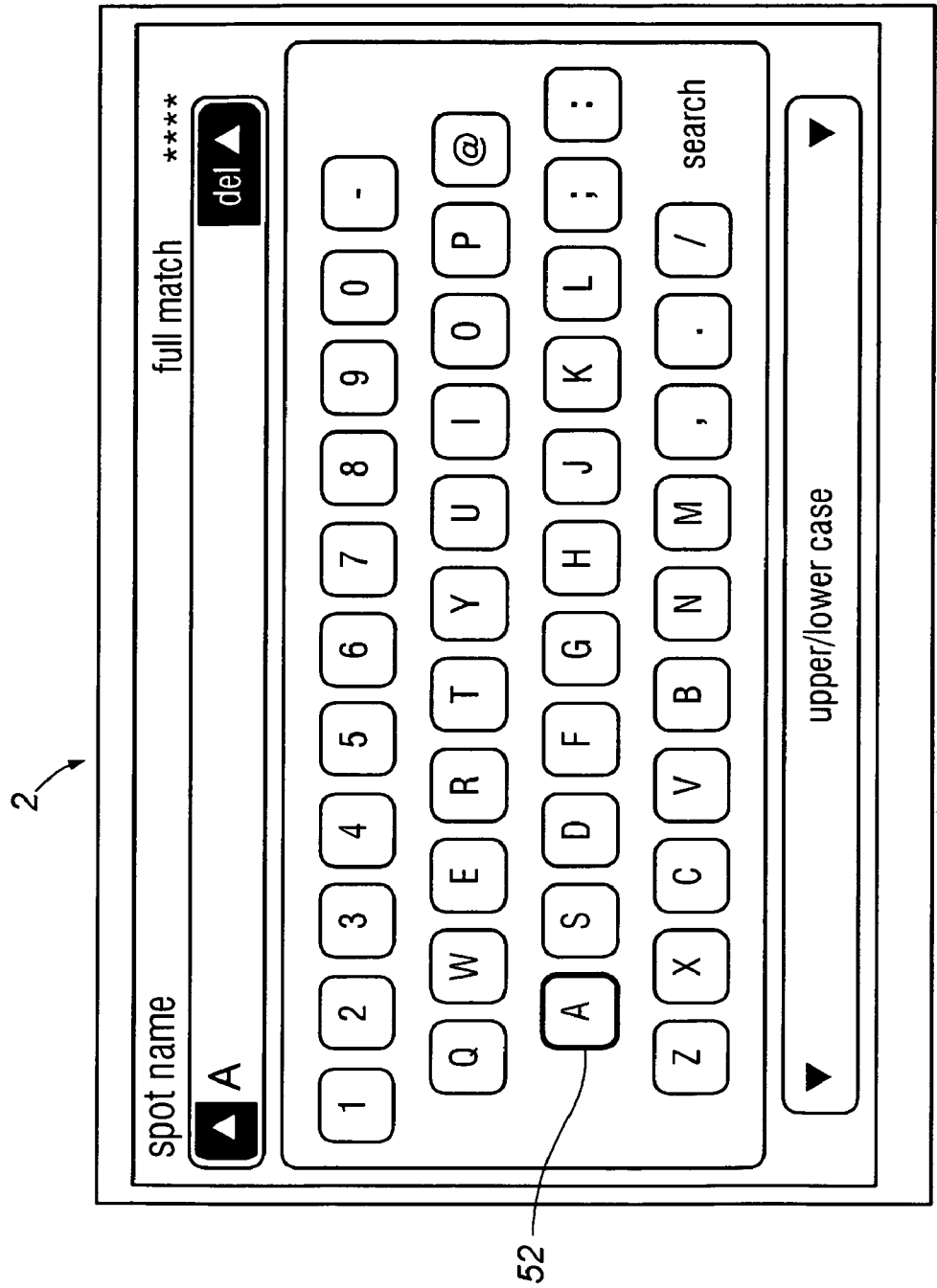

When the search genre is selected in step S2, the search unit main body 11 reads the corresponding database, for instance the spot name database 32 in step S3 and displays an alphanumeric keypad on the monitor 2 in step S4 (FIG. 6). Initially, a colored selection frame 52 surrounds letter A. The search unit main body 11 waits for a keystroke in step S5 and repeats this step at a prescribed interval as long as the determination result is NO.

Figure 7:
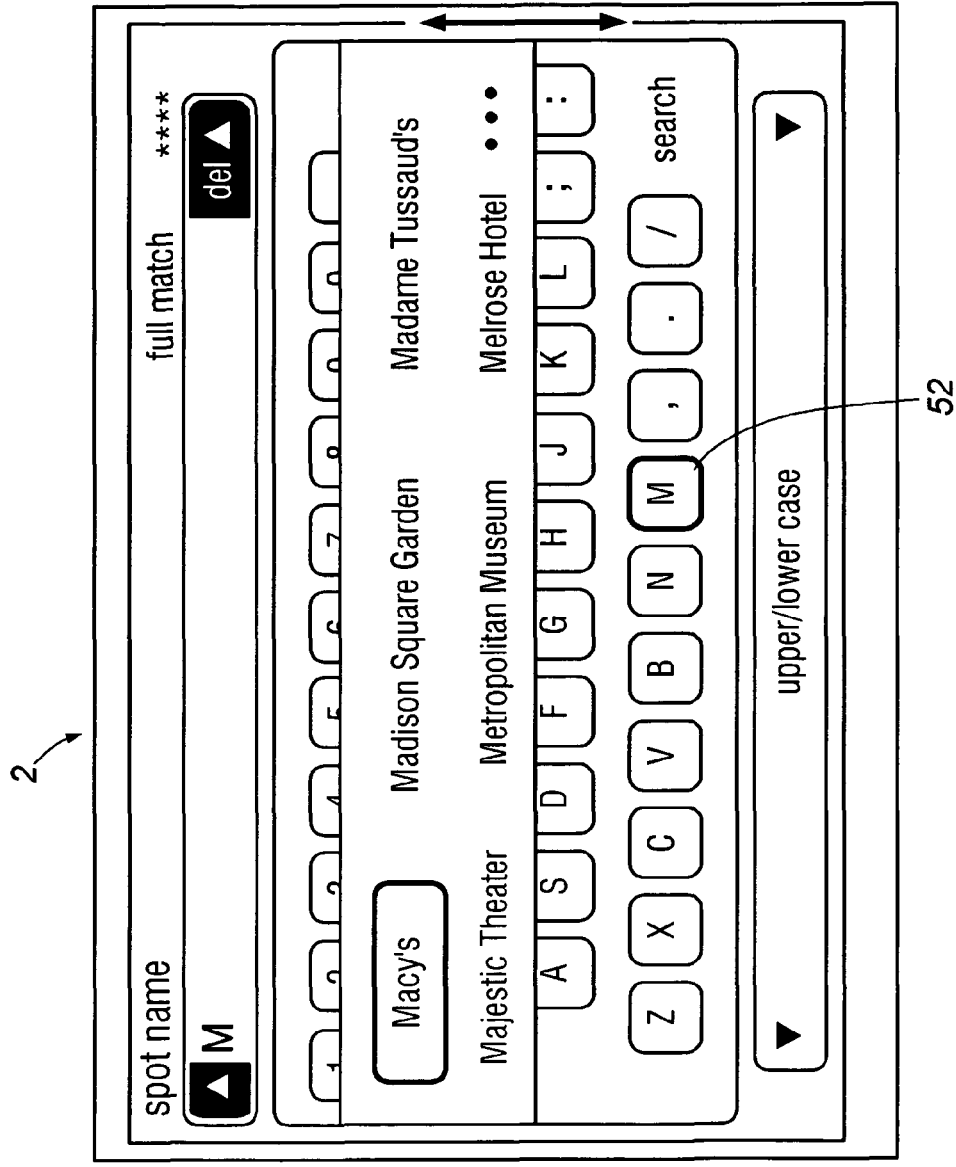
Figure 8A:
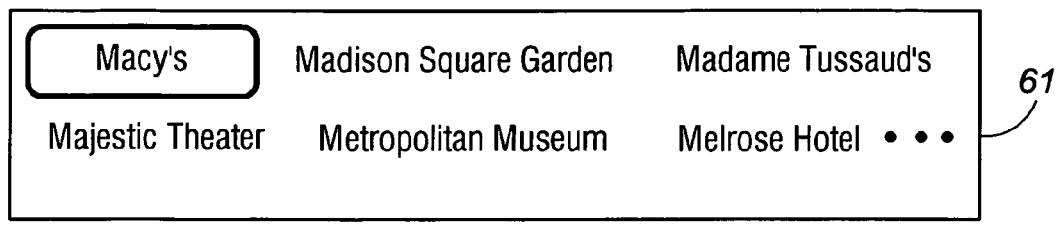

The user enters the first letter by operating the joystick 6 and jog dial 7, and once the determination result changes to YES in step S5, the search unit main body 11 selects a group of candidates whose name start with the entered letter A from the spot name database 32. For instance, when letter M is selected as the first letter, spot names starting with letter M (candidates) are listed in a candidate list window 61 that is displayed over the alphanumeric keypad on the monitor 2 (FIG. 7). When there are so many candidates that they do not fit in the candidate list window 61, those not shown in the candidate list window 61 may be displayed by scrolled up the screen by turning the jog dial 7. Thereby, the list can cover all the spot names that start with letter M as shown in FIG. 8a.

The search unit main body 11 then waits for a keystroke in step S8, and upon detecting a keystroke (YES) or selecting a desired one from the displayed candidates, a corresponding route search command is forwarded to a route search unit (not shown in the drawing) of the car navigation system in step S9 and this concludes the destination search process.

If the determination result is NO in step S8, the search unit main body 11 then determines if a second character is entered in step S10. As long as the determination result in step S10 is NO, the program flow returns to step S8 to repeat the intervening two steps (steps S8 and S10). Typically, when only one letter is selected, as the candidate list window 61 lists so many candidates, it is most likely that the user does not make the selection of a candidate and the determination result of step S8 is NO.

Figure 8B:

When the vehicle occupant has entered a second letter and the determination result of step S10 becomes YES, the search unit main body 11 narrows down the selection of the candidates in step S11, and the list of the narrowed down candidates are displayed in the candidate list window 61 in step S7. If the user selects letter E as the second letter, the corresponding candidates such as Metropolitan Museum, Melrose Hotel, . . . are displayed in the candidate list window 61 as illustrated in FIG. 8b. At this point, if the user selects a spot name and the determination result becomes YES in step S8, a route search command is forwarded to a route search unit (not shown in the drawing) of the car navigation system in step S9 and this concludes the destination search process.

Figure 8C:
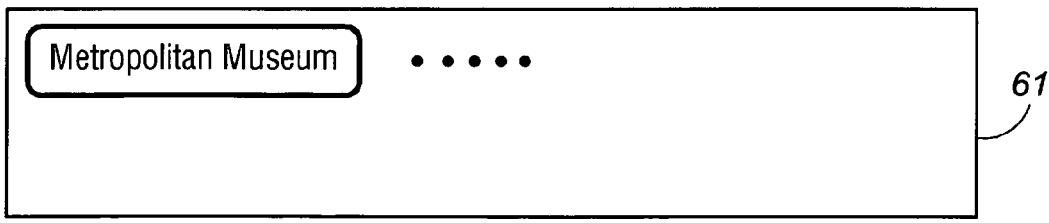

When the selection is not made at the point indicated in FIG. 8b, and the user additionally enters letter T, the candidates are narrowed down even further as illustrated in FIG. 8c. When letter T is additionally entered, only Metropolitan Museum is left as the candidate. At any of these points, if the vehicle occupant selects a spot name and the determination result becomes YES in step S8, a route search command is forwarded to a route search unit (not shown in the drawing) of the car navigation system in step S9 and this concludes the destination search process. In short, the vehicle occupant can either make the selection from a large number of candidates by entering a small number of letters or from a small number of candidates by entering a large number of letters depending on the particular preference of the vehicle occupant.

<<Address Search>>

Figure 9:
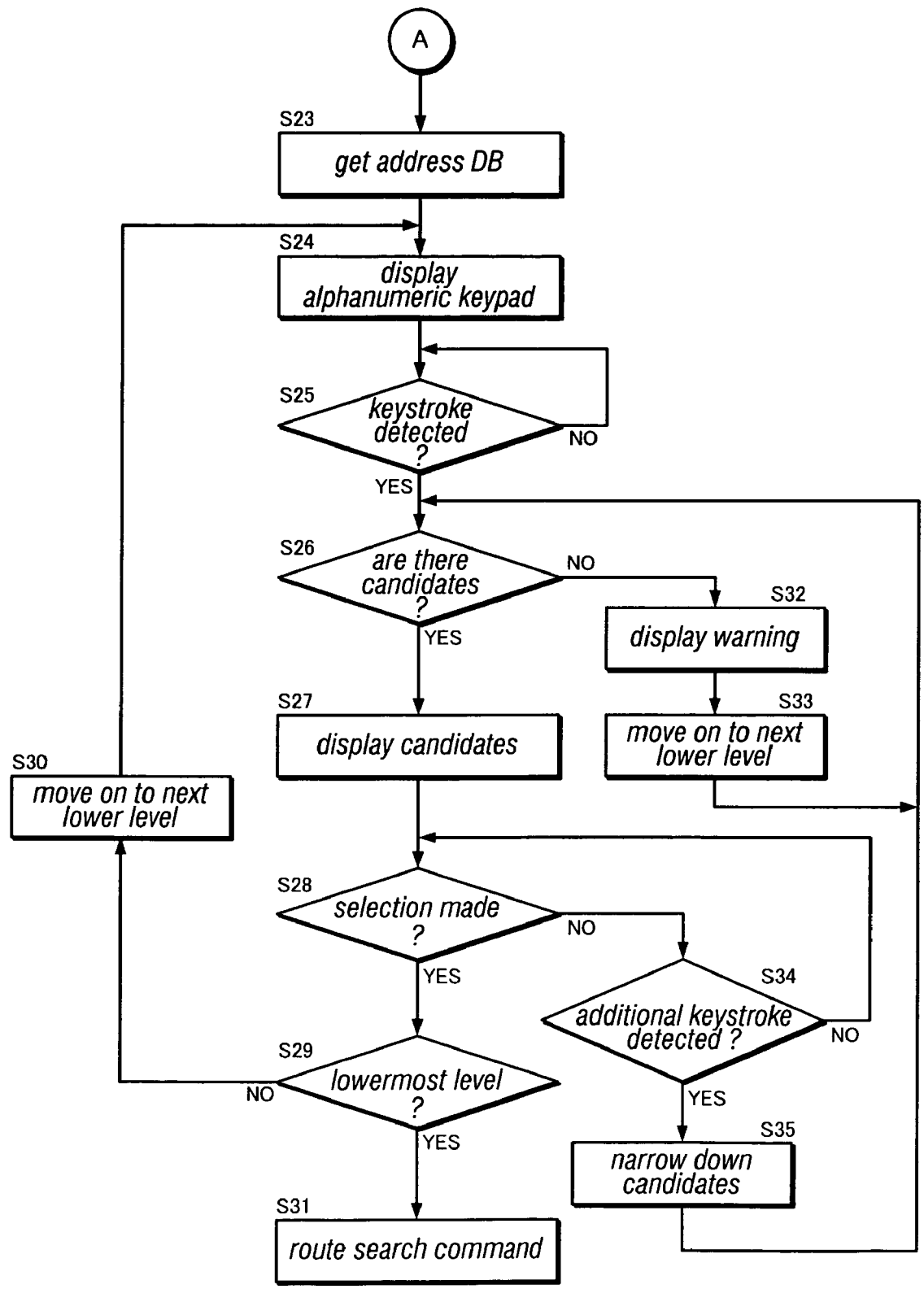
FIG. 9 is a flowchart showing the process flow when searching a spot by its address.
Figure 10:
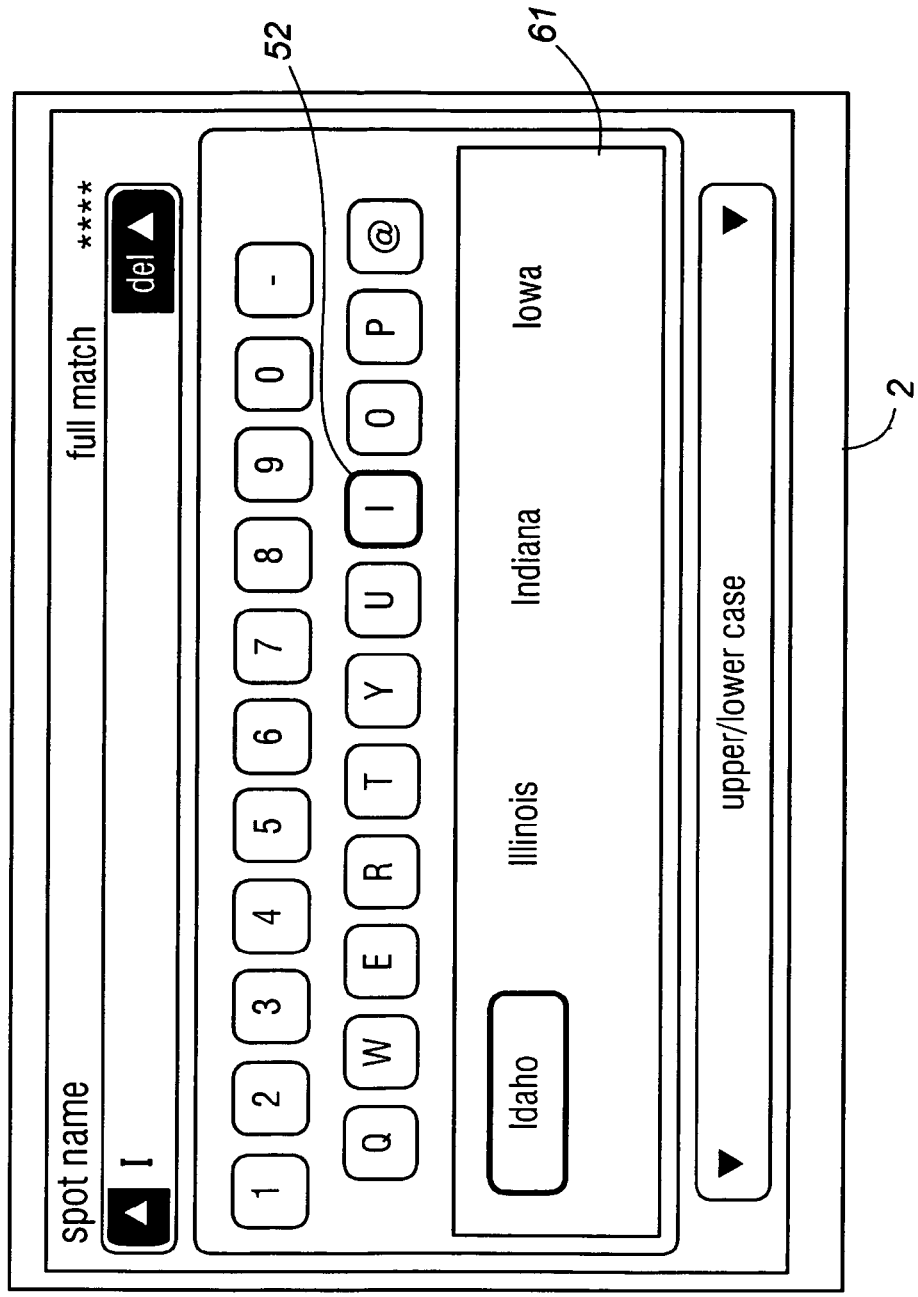
FIGS. 10 to 16 are displays on the monitor when executing an address search.

Suppose that the vehicle occupant wishes to designate an address given by "123 Bower St., Elkhart, Ind." as a destination. First of all, the vehicle operator presses a destination select button. Upon detecting that the destination select button is pressed, the search unit main body 11 starts executing a destination search process as shown in the flowchart of FIGS. 4 and 9. Various search genres are displayed on the monitor 2 in step S1. From the display on the monitor 2 showing the various search genres as shown in FIG. 5, the user selects the address search button 41 in step S22 in FIG. 4.

The search unit main body 11 then retrieves the address database 31 from the storage unit 13 in step S23 (FIG. 9) and displays alphanumeric characters on the monitor 2 in step S24 in a similar manner as in step S4. Initially, a colored selection frame 52 surrounds the letter A. The search unit main body 11 waits for a keystroke in step S25 and repeats this step at a prescribed interval as long as the determination result is NO.

When the vehicle operator has entered the first letter by operating the joystick 6 and jog dial 7, and once the determination result thereby changes to YES in step S25, the search unit main body 11 searches a group of candidates whose name start with a certain letter from the first hierarchy level 31a (state) of the address 31 in step S26. If there is at least one such state, the state or states are listed in a candidate list window 61 in step S27. For instance, when the vehicle occupant has selected I as the first letter, Idaho, Illinois, Indiana and Iowa are listed in the candidate list window 61 which is superimposed on the alphanumeric character display.

The search unit main body 11 then determines if a state is selected in step S28. Suppose that the user selects "Indiana" at this point. When the determination result changes to YES, it is determined if the current hierarchy level is the lowermost one in step S29. As this is clearly not the case when the vehicle occupant selects Indiana in the first hierarchy level 31a (step S28), the determination result is NO and the program flow advances to step S30. The candidate list window 61 then disappears, and the search unit main body 11 prompts the vehicle operator to select a candidate from those in a lower (a second) hierarchy level in step S30. The program flow then returns to step S24 and waits for a keystroke while the monitor 2 shows the alphabet letters in step S25.

Figure 11:
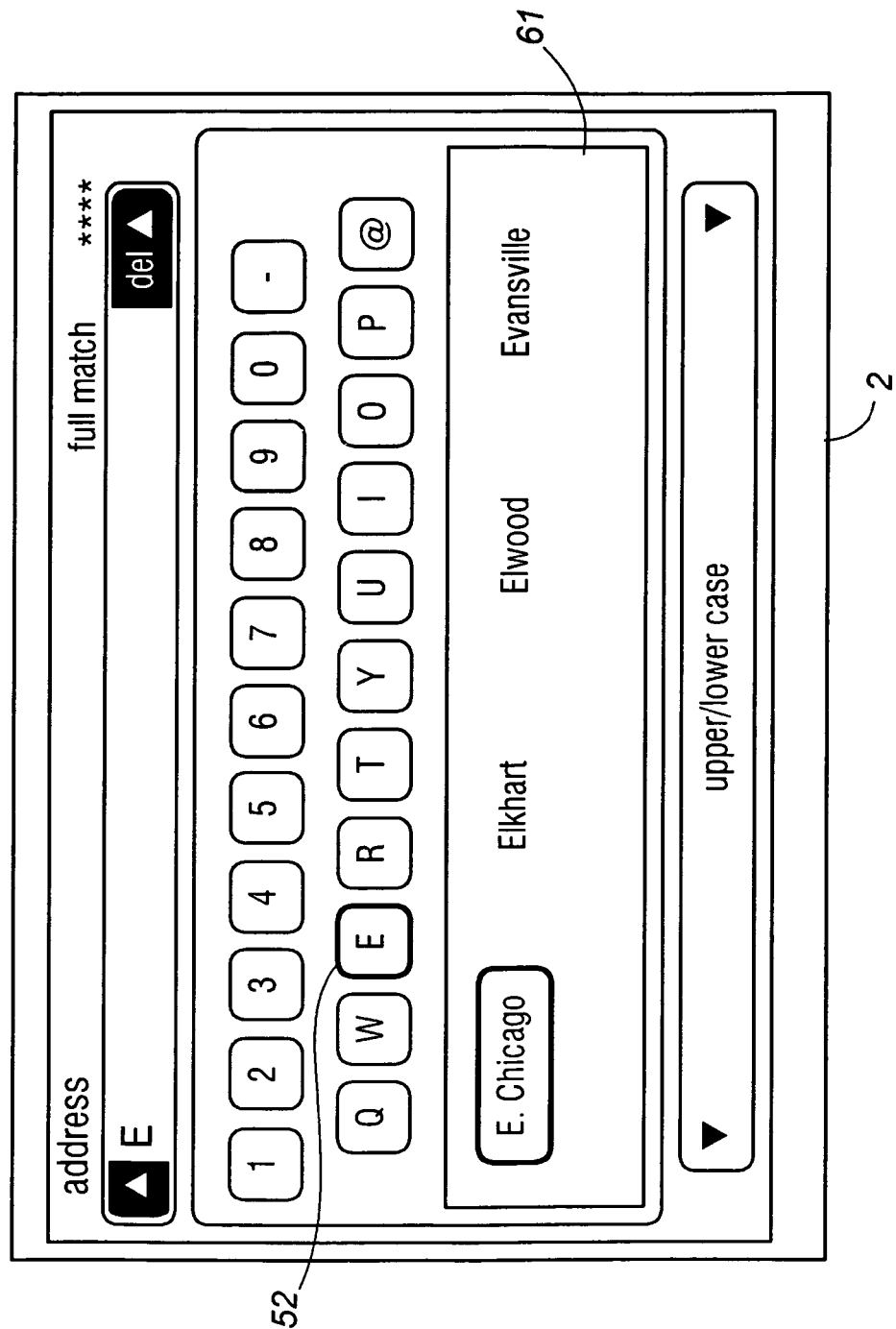

If the determination result of step S25 is YES, the search unit main body 11 determines if there is any candidate that starts with the selected letter that can be retrieved from the second hierarchy level candidates of the address database 31 in step S26. If the determination result is YES, the available candidates are displayed in step S27. For instance, if the vehicle occupant enters letter E, city names starting with letter E such as East Chicago, Elkhart, Elwood and Evansville are displayed in the candidate list window 61 in alphabetical order as shown in FIG. 11.

Figure 12:
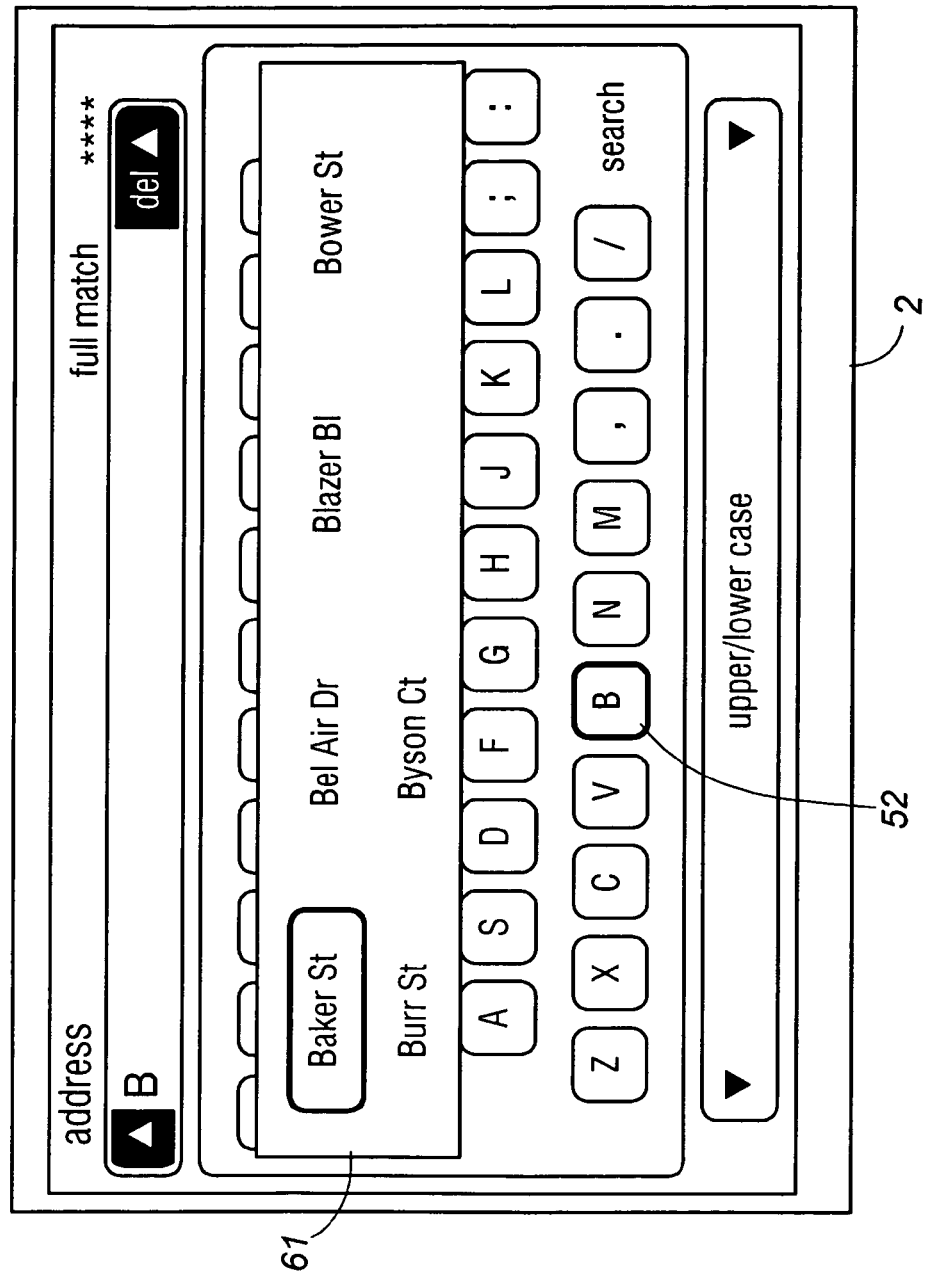
Figure 13A:
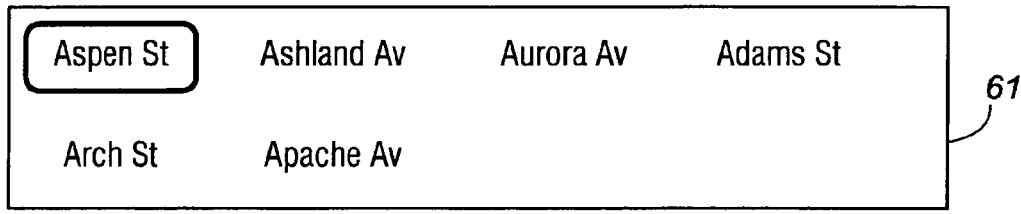
Figure 13B:
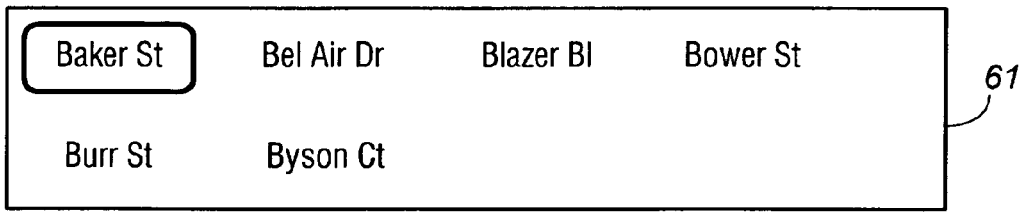

If the vehicle occupant selects Elkhart in the second hierarchy level 31b, the search unit main body 11 returns to step S24 to display the alphabet letters and wait for a keystroke in step S25. When the determination result of step S25 is YES, the search unit main body 11 determines if there are any corresponding candidates in the third hierarchy 31c of the address database 31, and if this determination result is YES, the program flow advances to step S27 to list the available candidates. Initially, the candidate list window 61 lists street names whose name start with letter A as shown in FIG. 13a. For instance, if the vehicle occupant has entered letter B, street names such as Baker Street, Bel Air Dr, Blaser Boulevard and Bower Street are displayed in the candidate list window 61 as names of streets that start with letter B as shown in FIG. 12 and FIG. 13b.

Figure 13C:
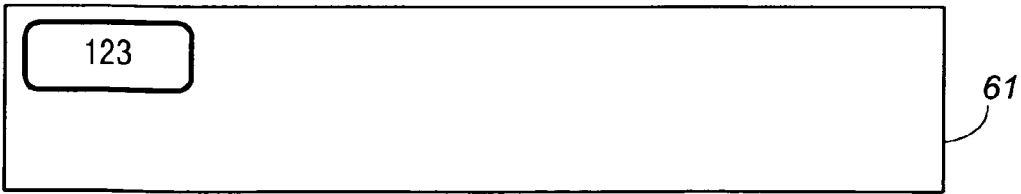

When the vehicle occupant has selected a street such as Bower Street in step S28, the search unit main body 11 waits for the entry of a house number. When the vehicle occupant has entered a house number such as "123" as shown in FIG. 13c, as the determination result of step S28 becomes YES and the lowermost level of the search hierarchy has been reached in step S29, a route search command is forwarded to a route search unit (not shown in the drawing) of the car navigation system in step S31 and this concludes the destination search process.

<<No Available Candidates>>

Figure 14:
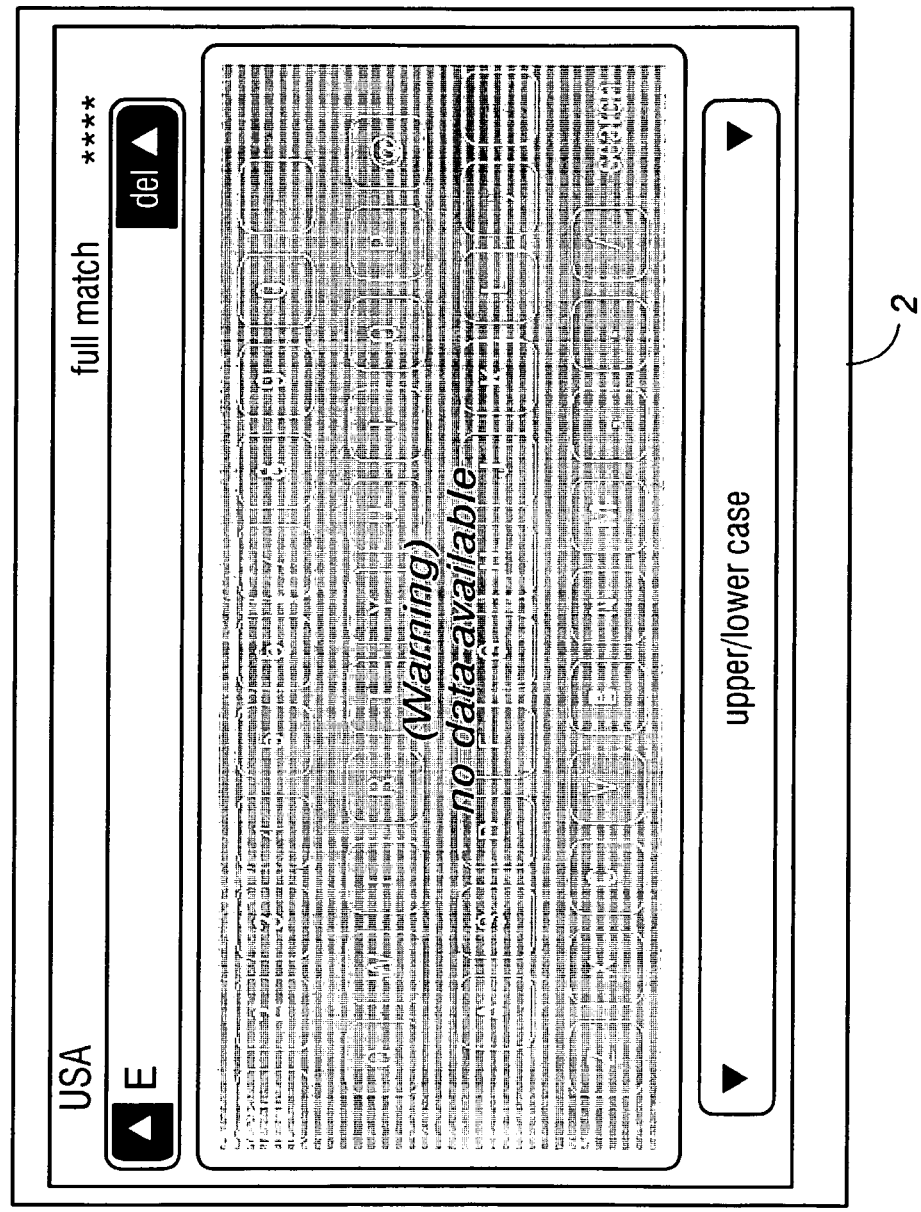
Figure 15:
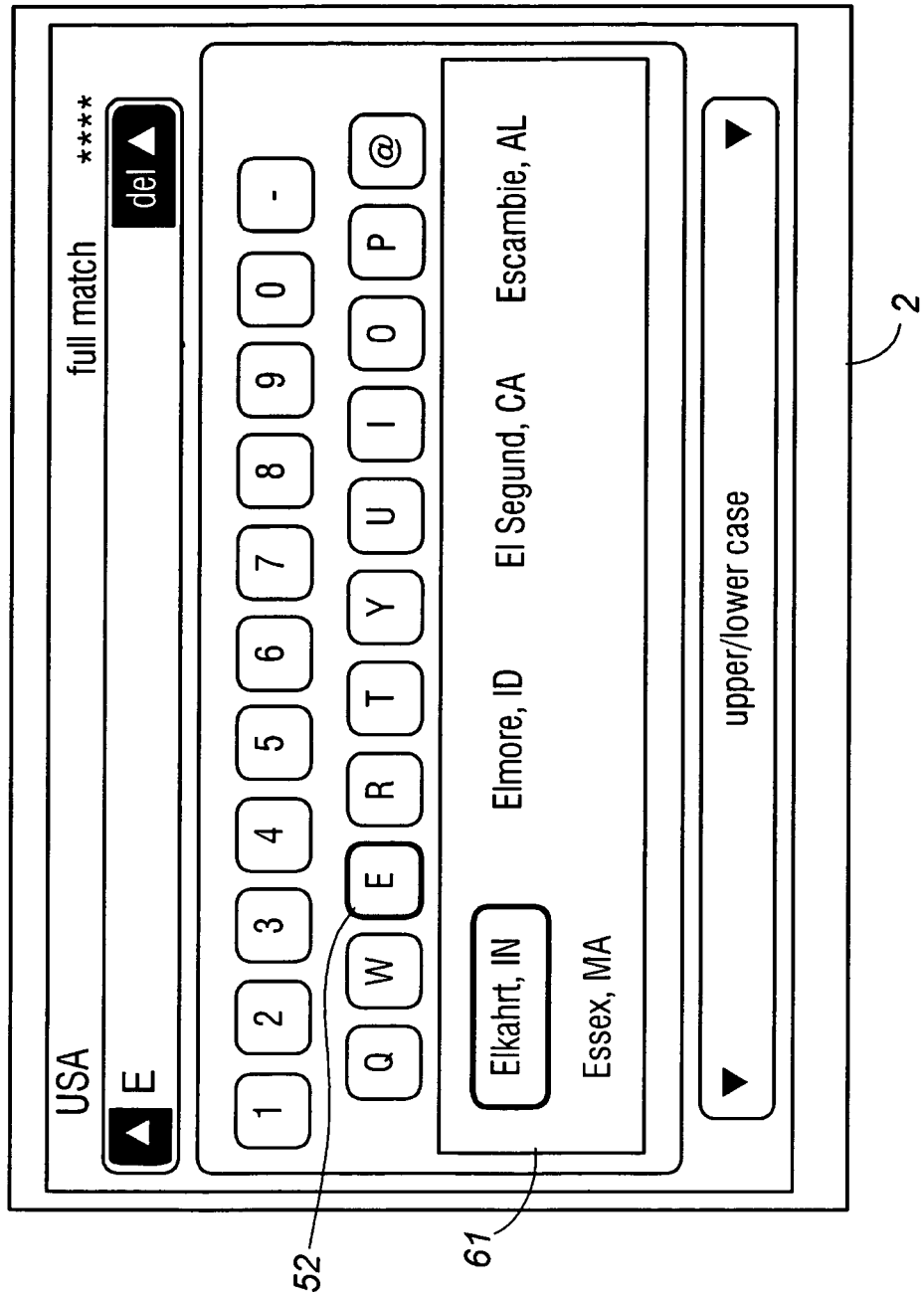

When the vehicle occupant has entered a letter, the search unit main body 11 may not able to find any candidate from the current hierarchy level in step S26. Suppose that the user has entered letter E in the first hierarchy level to designate "Elkhart" either because the user did not realize that the name of the state of Indiana should have been designated before doing so or the user could not remember the name of the state in which Elkhart is located. As the determination result in step S26 is NO, a warning is briefly displayed on the monitor 2 in step S32 as shown in FIG. 14, and the program flow moves on to the next lower hierarchy level (second level 31b) in step S33. The program flow then returns to step S26 to determine if there is a corresponding candidate in the second hierarchy 31b of the address database 31, and if there are any candidates, they are displayed on the monitor 2 as shown in FIG. 15.

Figure 16A:
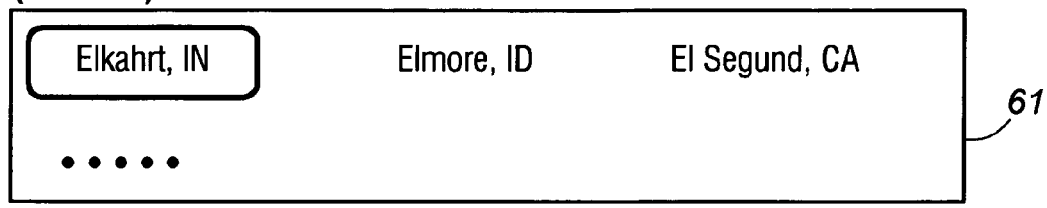
Figure 16B:
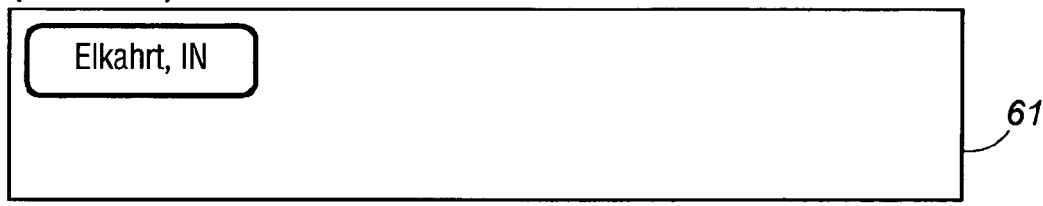

The cities whose names start with letter E include Elkhart, Ind., Elmore, Id., El Segund, Calif., Escambie, Ala., Essex, Mass. and so on. Accordingly, these candidates are displayed in the candidate list window 61, and each candidate is displayed in combination with the name of the state in which the corresponding city is located as shown in FIG. 15. Therefore, the candidates selected from the current hierarchy level are each placed next to the associated data from the immediately upper hierarchy level. In this particular case, the names of cities that are displayed in the candidate list window 61 are each placed next to the state in which the particular city is located. If no selection is made in step S28, the system waits for the next keystroke in step S34. If letter L is entered as the second letter, the candidates are narrowed down in step S35 to Elkhart, Ind., Elmore, Id. and El Segund, Calif., and the corresponding display in the candidate list window 61 is shown in FIG. 16a. If the user enters a third letter K in step S34, the candidate is narrowed down to a single city in step S34 as shown in FIG. 16b. The user then selects "Elkhart, Ind." in step S28, the program flow advances to step S29, and the search in the lower hierarchy levels is continued until the lowermost level is reached (YES in step S29). Once the lowermost level is reached, a route search command is forwarded to a route search unit (not shown in the drawing) of the car navigation system in step S31 and this concludes the destination search process.

MODIFIED EMBODIMENT

Figure 17:
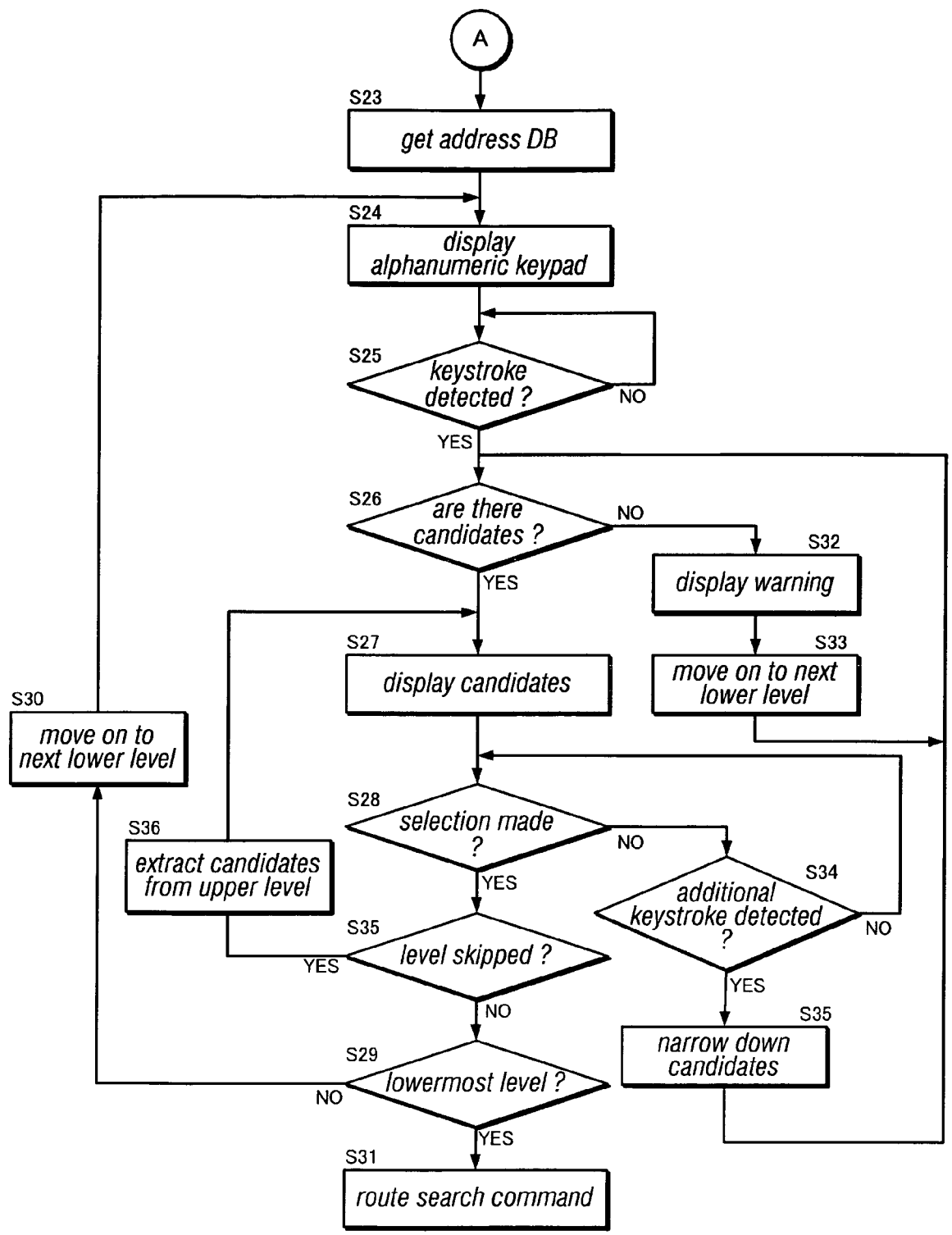
FIG. 17 is a flowchart showing the process flow when searching a spot by its address according to a modified embodiment of the present invention.
Figure 18:
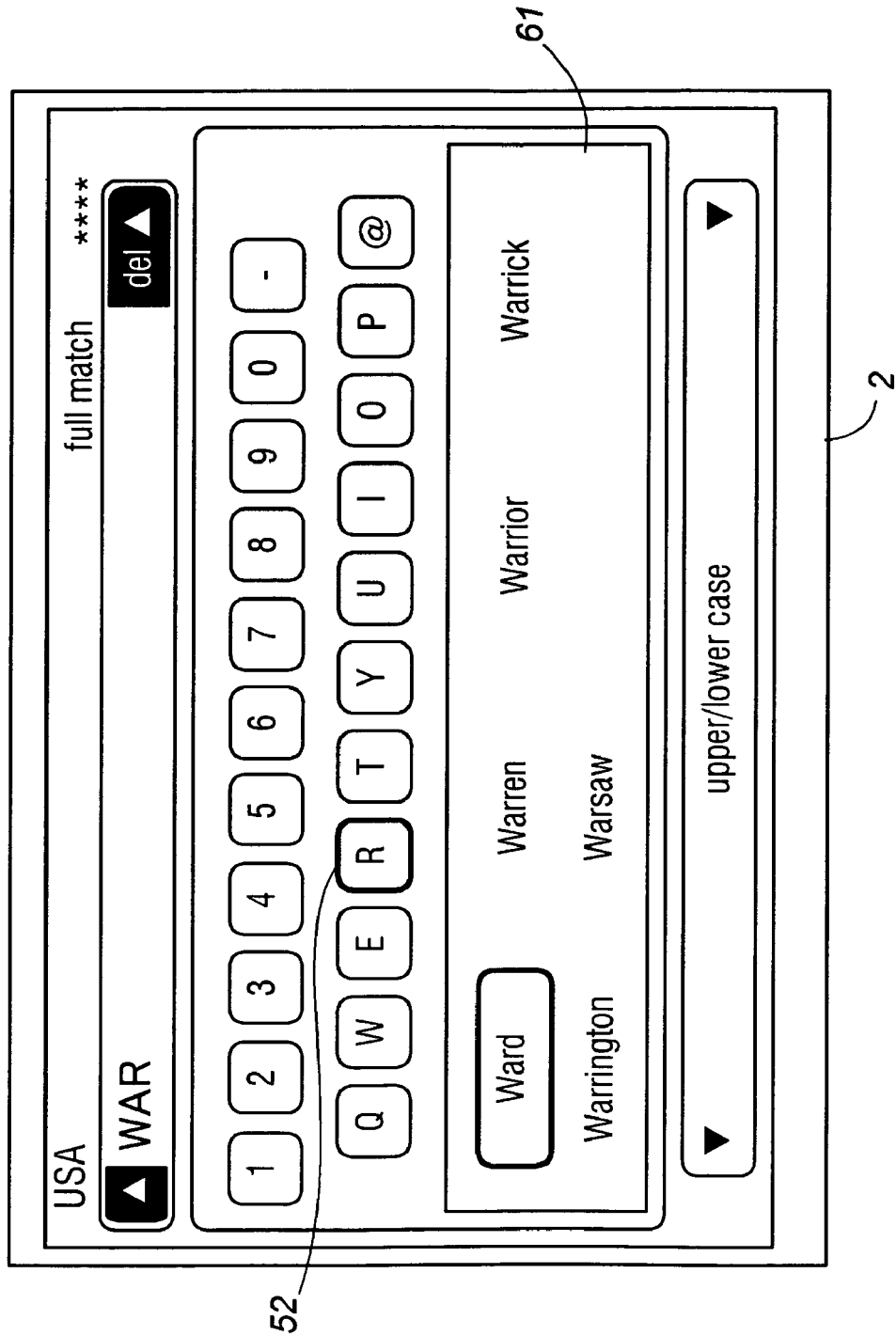

A modified embodiment is now described in the following with reference to FIGS. 17 to 19. The flowchart of FIG. 17 is similar to that of FIG. 9, and some of the steps in FIG. 17 common to those of FIG. 9 are denoted with like step numbers without repeating the description of such steps.

Suppose a case where the user designates a city name (Warren) before designating a state name (Michigan). The user enters letter W in step S25 and continues to enter two more letters AR by repeating steps S34 and S26 to S28. As the initial hierarchy level consists of the topmost hierarchy level (states) but there is no state whose name starts with letters WAR, the program flow advances to step S32, and briefly displays a warning, and the system then moves on to the next lower level (cities) in step S33.

If there are any such candidates in the next lower hierarchy level in step S26, they are displayed, in the candidate list window 61 appearing on the monitor 2 in step S27. In this case, candidates of cities whose names start with letter WAR such as Ward, Warren, Warrior, Warrick, Warrington and Warsaw are displayed on the monitor 2 as shown in FIG. 18. If the user desires to narrow down the candidates, the user enters a fourth letter and the program flow advances to steps S34 and steps 26 to 28. At any event, if one of the candidates (Warren, for instance) is selected in step S28, it is then determined if there was a skip in search hierarchy levels in step S35. If a city name is designated without designating the corresponding state name, as it means that there was a skip in search hierarchy levels, the program flow advances to step S36 and shows candidates from the upper level hierarchy which consist of the state names that correspond to the selected city.

Since the cities having the name of Warren exist in a number of different states, the corresponding states such as Michigan, Ohio, Pennsylvania, Rhode Island, Tennessee and Virginia are displayed on the monitor 2 as shown in FIG. 19 in step S27. If the user selects Michigan in step S27 by realizing or remembering that Warren the user has in mind is located in Michigan, this completes the designation of the city, and the program flow moves on to steps S35 and S29 to determine the street name and house number in the lower hierarchy levels.

Although the present invention has been described in terms of preferred embodiments thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. An information retrieval system, comprising;
a storage unit storing a character type database containing character string data in a plurality of search hierarchy levels, a higher hierarchy level representing a larger geographical area than a lower hierarchy level;
an interface unit allowing a user to enter characters;
a character type data search unit retrieving character data designated by the interface unit from a higher hierarchy level to a lower hierarchy level as a candidate or a plurality of candidates for selection;
a monitor displaying the candidate or candidates of data retrieved from each hierarchy level of the database, the interface unit allowing the user to select a desired one from the candidate or candidates;
wherein if a current hierarchy level does not include any candidate of data that corresponds to a character string entered by the user on the interface unit, the character type data search unit retrieves candidates from a next lower hierarchy level, and displays the retrieved candidates on the monitor;
wherein when one of the candidates in the lower hierarchy level is selected, the character type data search unit retrieves character string information corresponding to the selected lower hierarchy level candidate from the upper hierarchy level, and
wherein when the character string information retrieved from the upper hierarchy level comprises a plurality of candidates, the character string information retrieved from the upper hierarchy level is displayed as upper hierarchy level candidates on the display for the user to select.

2. The information retrieval system according to claim 1, wherein when a current hierarchy level does not include any candidate of data that corresponds to the character string entered by the user on the interface unit and the character type data search unit retrieves a candidate or candidates from a next lower hierarchy level, the character type data search unit displays the candidate or candidates on the monitor in combination with the corresponding data of the next higher hierarchy level.

3. The information retrieval system according to claim 1, wherein when a current hierarchy level does not include any candidate of data that corresponds to a character entered by the user on the interface unit and the character type data search unit retrieves a candidate or candidates from a next lower hierarchy level, the character type data search unit displays the candidate or candidates on the monitor, and after the candidate or one of the candidates is selected by the user, displays corresponding candidates of data in the next higher hierarchy level on the monitor.

4. The information retrieval system according to claim 1, wherein the character type data search unit is configured to receive a string of characters entered from the interface unit and retrieve data that corresponds to the string of characters from each hierarchy level.

5. The information retrieval system according to claim 1, wherein the data consist of address information of a car navigation system.

* * * * *